United States Patent [19]
Miles

[11] Patent Number: 5,918,887
[45] Date of Patent: Jul. 6, 1999

[54] DRILL CHUCK WITH MATCHING JAW AND JAW PASSAGEWAYS

[75] Inventor: Kevin C. Miles, Clemson, S.C.

[73] Assignee: Power Tool Holders Incorporated, Wilmington, Del.

[21] Appl. No.: 09/016,103

[22] Filed: Jan. 30, 1998

[51] Int. Cl.⁶ .................................................. B23B 31/12
[52] U.S. Cl. .............................. 279/62; 279/60; 279/123; 279/158; 279/902
[58] Field of Search ....................... 279/60–65, 114–116, 279/902, 123, 158; 269/257

[56] References Cited

U.S. PATENT DOCUMENTS

| | | | |
|---|---|---|---|
| 3,910,589 | 10/1975 | Derbyshire | 279/158 |
| 4,154,450 | 5/1979 | Derbyshire | 279/158 |
| 5,348,317 | 9/1994 | Steadings et al. | 279/62 |
| 5,816,583 | 10/1998 | Middleton | 279/62 |

Primary Examiner—Steven C. Bishop
Attorney, Agent, or Firm—Dority & Manning

[57] ABSTRACT

A chuck device for use with a manual or powered driver has a body member with a plurality of angularly disposed passageways formed therethrough. A jaw is slidably positioned in each passageway. Each jaw has a tool engaging face formed on one side and threads formed on the opposite side. The jaws are threadedly engaged with a rotatable nut mounted on the body member. A sleeve member is in rotational engagement with a nut whereby rotation of the sleeve causes the nut to rotate and the jaws to advance or retract within their respective passageways. Each jaw and its respective passageway has a unique matching profile different from the other jaws and respective passageways so that the jaws cannot be interchanged with different passageways in the chuck.

25 Claims, 3 Drawing Sheets

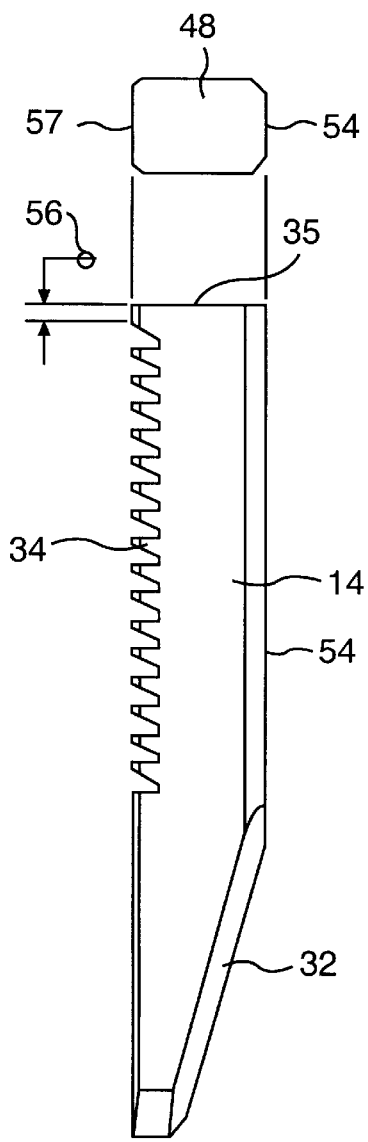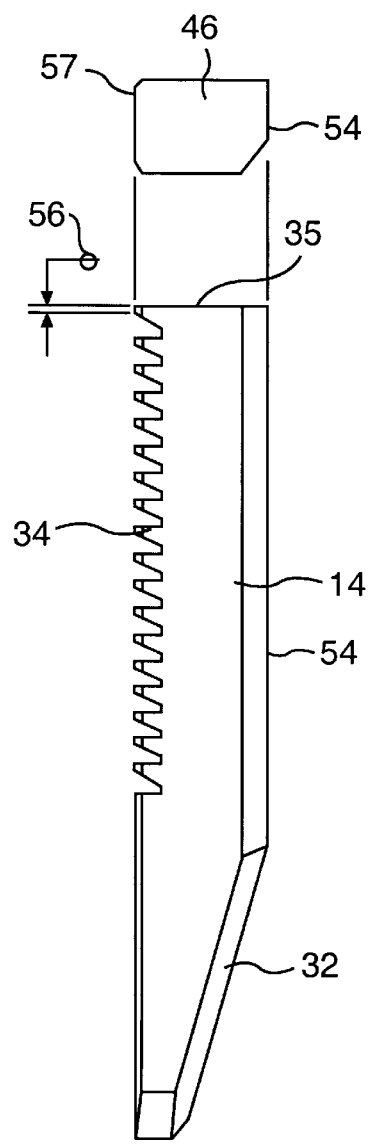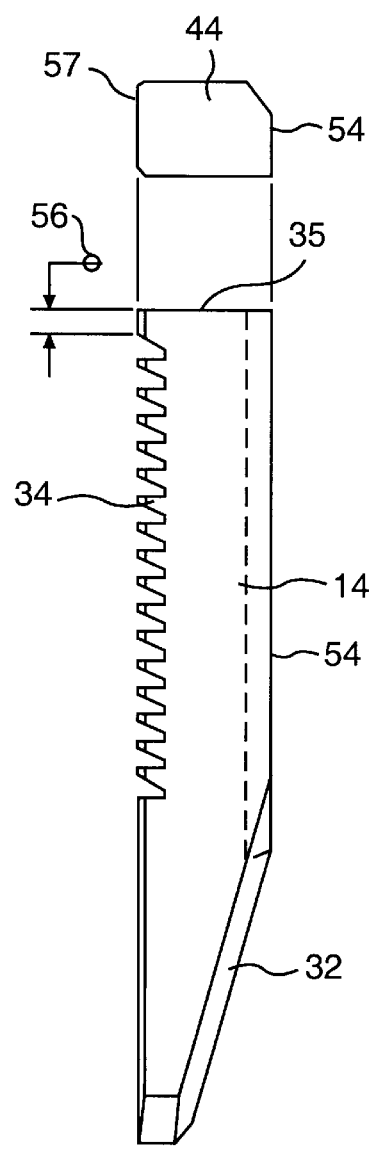
FIG. 3   FIG. 4   FIG. 5

DRILL CHUCK WITH MATCHING JAW AND JAW PASSAGEWAYS

BACKGROUND OF THE INVENTION

The present invention relates generally to chucks for use with drills or with electric or pneumatic power drivers. Both hand and electric or pneumatic power tool drivers are well known. Any number of conventional tools are used with such drivers, such as drill bits, screw drivers, nut drivers, burrs, grinding stones, and other cutting or abrading tools. The power drivers are conventionally configured with a chuck which is adjustable over a relatively wide range to hold the tools to a rotatable spindle of the power drivers. The chuck can be attached to the drivers by a conventional threaded or tapered bore, or other conventional attaching mechanisms.

A wide variety of chucks have been developed in the art. In one form of chuck, three jaws spaced circumferentially, approximately 120° apart from each other, are constrained by angularly disposed passageways in a body attached onto the drive spindle and configured so that rotation of the body in one direction relative to a constrained nut engaging the jaws forces the jaws into gripping relationship with respect to the shank of a tool bit, while rotation in the opposite direction releases the gripping relationship Such a chuck may be keyless if it is rotated by hand. Such keyless chucks are well known to those skilled in the art. The jaws engage with the drive nut by way of threads having the same pitch for all of the jaws. In this manner, the jaws advance the same degree upon rotation of the nut. However it is important that the jaws move longitudinally so that in their fullest extended position, the jaws have the same longitudinal length and meet at the axis of the tool bore defined in the chuck body. For this reason, with conventional multi-threaded jaws, the threads are sequentially and variably off-set from ends of the jaw blades to account for the circumferential spacing of the jaws and to ensure that the jaws meet at the axis of the chuck in their fully extended position. Thus, the jaws are not interchangeable in a conventional chuck and it is extremely important that the jaws are placed in the right order within the chuck during the manufacturing and assembly process. This requires a tedious and time consuming process. If the jaws are not placed in the correct order, the chuck does not function correctly and must be disassembled and reassembled in the proper order.

With conventional chucks, the body member is typically formed from metal bar stock and the jaw passageways are machined through the bar stock. The machine process thus requires that the passageways be essentially circular and uniform in cross section. The jaw blades have a correspondingly shaped profile and are generally not distinguishable from each other except for the off-set in jaw threads.

OBJECTS AND SUMMARY OF THE INVENTION

Accordingly, it is a principle object of the present invention to provide a chuck device wherein jaw blades are uniquely matched with individual respective passageways thereby simplifying the assembly and manufacturing process.

It is another object of the present invention to provide a chuck that can be assembled and manufactured in a cost effective manner.

It is another object of the present invention to provide an improved chuck having a molded main body with distinctive and different jaw passageways for each respective jaw.

Additional objects and advantages of the invention will be set forth in part in the following description, or will be obvious from the description, or may be learned through practice of the invention.

In accordance with the objects and purposes of the invention, a chuck is provided for use with manual or powered drivers having a rotatable drive shaft. The chuck is conventionally mounted to the drive shaft and provides a mechanism for attaching a tool to the power driver. The chuck has a body member having a nose section and a tail section. The nose section has an axial bore formed therein and a plurality of angularly disposed passageways formed therethrough and intersecting the axial bore. A plurality of jaws are slidably positioned in the angularly disposed passageways Each of the jaws has a tool engaging face formed on one side thereof and threads formed on an opposite outer surface thereof A nut is rotatably mounted on the body member and is in engagement with the threads on the jaws. A sleeve member is in driving rotational engagement with the nut whereby when the sleeve is rotated with respect to the body member, the jaws will be moved within their respective passageway. According to a principle object of the invention, each jaw and its respective passageway have a unique matching profile different from the other jaws and respective passageways so that the jaws cannot be interchanged with different passageways. Thus, it is virtually impossible to mix or interchange the jaws upon assembly of the chucks In a preferred embodiment of the invention, each of the passageways has a different multi-sided cross-sectional profile, for example a generally rectangular profile. At least one characteristic, such as a side or corner, of the multi-sided profile is different for each passageway The jaw designed for the respective passageway has a correspondingly matching profile. It is preferred that the jaws have essentially the same profile on the sides thereof defining the threads. In other words, the jaws should each have the same thread length in a cross-sectional view thereof.

Preferably, the body member of the chuck is molded from a moldable material, such as a plastic material or glass filled nylon material Other moldable materials are known to those in the art and are within the scope and spirit of the invention Since the body member is molded, the profiles for the passageways can be molded directly and it is not necessary to subsequently machine the passageways Thus, additional manufacturing and assembly time and processes are eliminated. However, it should be understood, that the present invention is not limited to molded body members or molded passageways. Although it would involve relatively complicated machining, it is possible and within the scope and spirit of the invention to machine differently profiled jaw passageways in a metal bar stock body member.

It should be appreciated that any manner of profile changes, keyed surfaces, etch, can be configured with the jaws and passageways so that only one jaw will fit in each passageway The geometry of the passageways and jaws can be varied infinitely in this regard. Such variations and modifications are within the scope and spirit of the invention.

BRIEF DESCRIPTION OF THE DRAWINGS

FIG. 3 is a perspective view and cross-sectional view of one jaw blade according to the invention;

FIG. 4 is a perspective view and cross-sectional view of a different jaw blade; and FIG. 5 is a perspective view and cross-sectional view of yet another differently configured jaw blade from the chuck illustrated in FIG. 1.

DETAILED DESCRIPTION OF THE PREFERRED EMBODIMENTS

Figure 1:
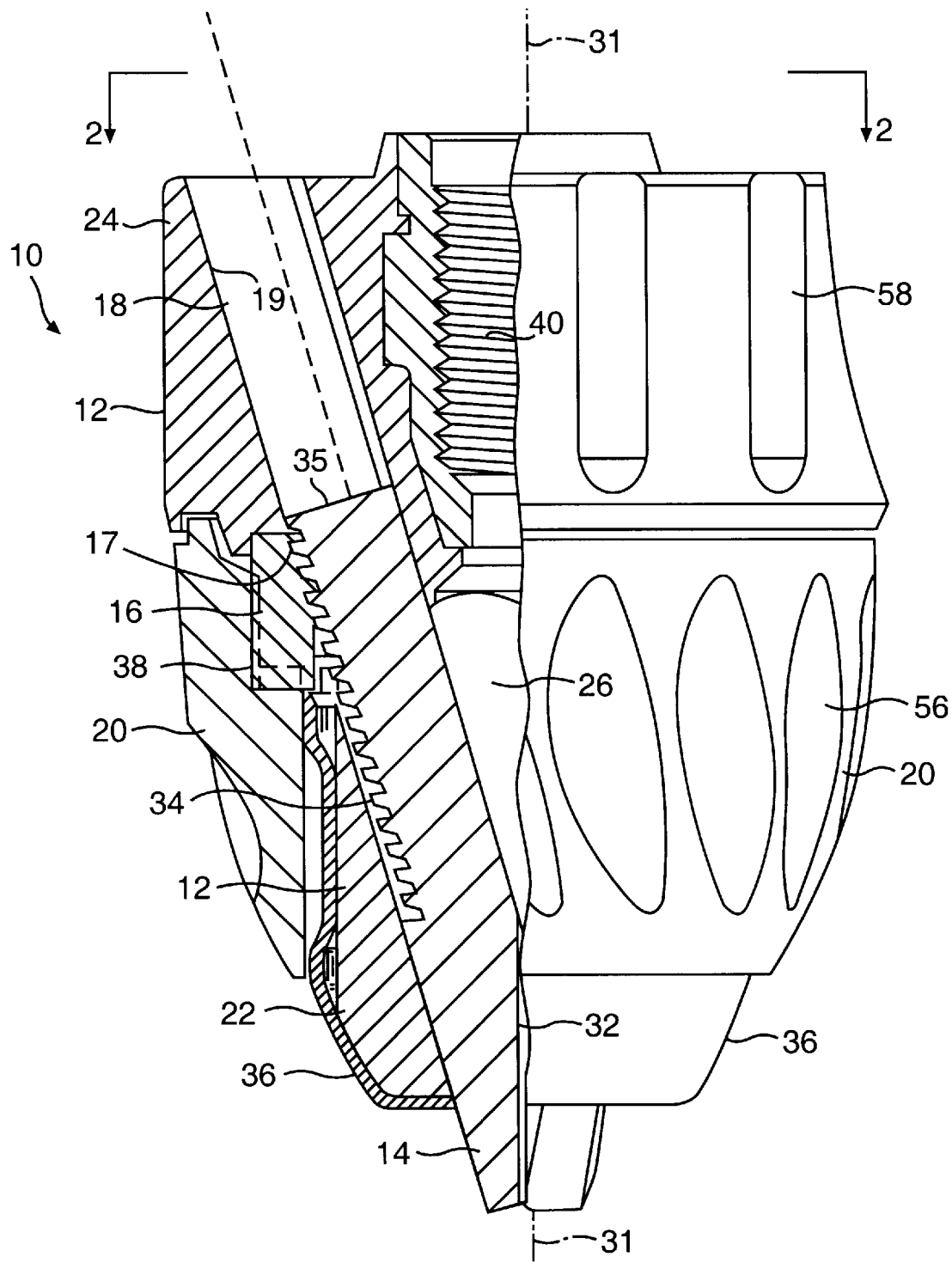
FIG. 1 is a cross-sectional view of a chuck according to the invention.

Reference will now be made in detail to the presently preferred embodiments of the invention, one or more examples of which are illustrated in the drawings. Each example is provided to explain the invention, and is not meant as a limitation of the invention. For example, features illustrated or described as part of one embodiment can be used in another embodiment to yield still a further embodiment. It is intended that the present disclosure include such modifications and variations.

Referring to FIG. 1, a chuck in accordance with an embodiment of the present invention is illustrated. Chuck 10 includes a front sleeve member 20, a body member 12, and jaws 14. Body member 12 has a generally cylindrical nose or forward section 22 and a rear or tail section 24. An axial bore 26 is formed in nose section 22 of body member 12. Axial bore 26 is at least as large as the largest tool shank that chuck 10 is designed to accommodate. A bore 28 is formed in tail section 24 of body member 12 and may be formed with internal threads 40 or may be affixed to a threaded insert member (not shown) either of which is adapted to mate with a drive spindle or shaft of a powered driver (not shown) It should be appreciated that any manner of well known and conventional mounting mechanism or device can be used in the present invention to mount the chuck 10 to a drive spindle.

Passageways 18 (18a 18b, and 18c in FIG. 2) are formed in body member 12 to accommodate each jaw 14. Each passageway includes an outer circumferential wall 19. In a preferred embodiment, three jaws 14 are utilized, and each jaw 14 is separated from the adjacent jaw by an arc of approximately 120°. The axis 30 of each passageway 18 and respective jaw 14 are angled with respect to the chuck axis but intersect with the chuck axis 31 at a common point beyond the nose section 22 of body member 12. For example, as seen in FIG. 1, in their fullest extended position, jaws 14 meet at the axis 31 of bore 26 at a point forward of nose section 22. As illustrated in FIG. 1, it is important that the three jaws 14 meet at essentially the exact location in their fullest extended position.

Each jaw 14 has a tool engaging face 32 which is generally parallel to axis 14 of body 12, and a back end or face 35. Each jaw 14 also has threads 34 formed on its opposite outer surface. Threads 34 can have any predetermined pitch and all of the jaw threads 34 have the same pitch.

A nut 16, preferably a unitary nut, includes threads 17 in threaded engagement with threads 34 on jaws 14. In this manner, when nut 16 is rotated with respect to body 12, the jaws will be advanced or retracted within passageway 18. Nut 16 is rotatably coupled with sleeve member 20 so that upon rotation of sleeve member 20 nut 16 also rotates to retract or advance jaws 14.

Any number of variations and configurations can be utilized in the present invention to retain sleeve 20 and nut 16 relative to body member 12, and also to rotationally couple nut 16 and sleeve 20. For example, in the embodiment illustrated in FIG. 1, sleeve 20 is rotationally coupled to nut 16 by way of a press fit 38. Alternatively, interengaging members, such as ridges or drive dogs, could be utilized. Alternatively, nut 16 and sleeve 20 could be co-molded. All such modifications and configurations of the sleeve and nut are within the scope and spirit of the invention and are not particularly important to the present invention.

FIG. 1 also illustrates a nose piece 36 fitted over nose section 22 of body member 12. In one embodiment, nose piece 36 can be utilized to hold sleeve 20 relative to body member 12 and nut 16. In an alternative embodiment, nose piece 36 can be provided as a reinforcing and protective member, particularly where sleeve 20 and nut 16 are press-fitted together. Nose piece 36 is not essential to the present invention and is not necessary in all configurations of chuck device 10.

Figure 2:
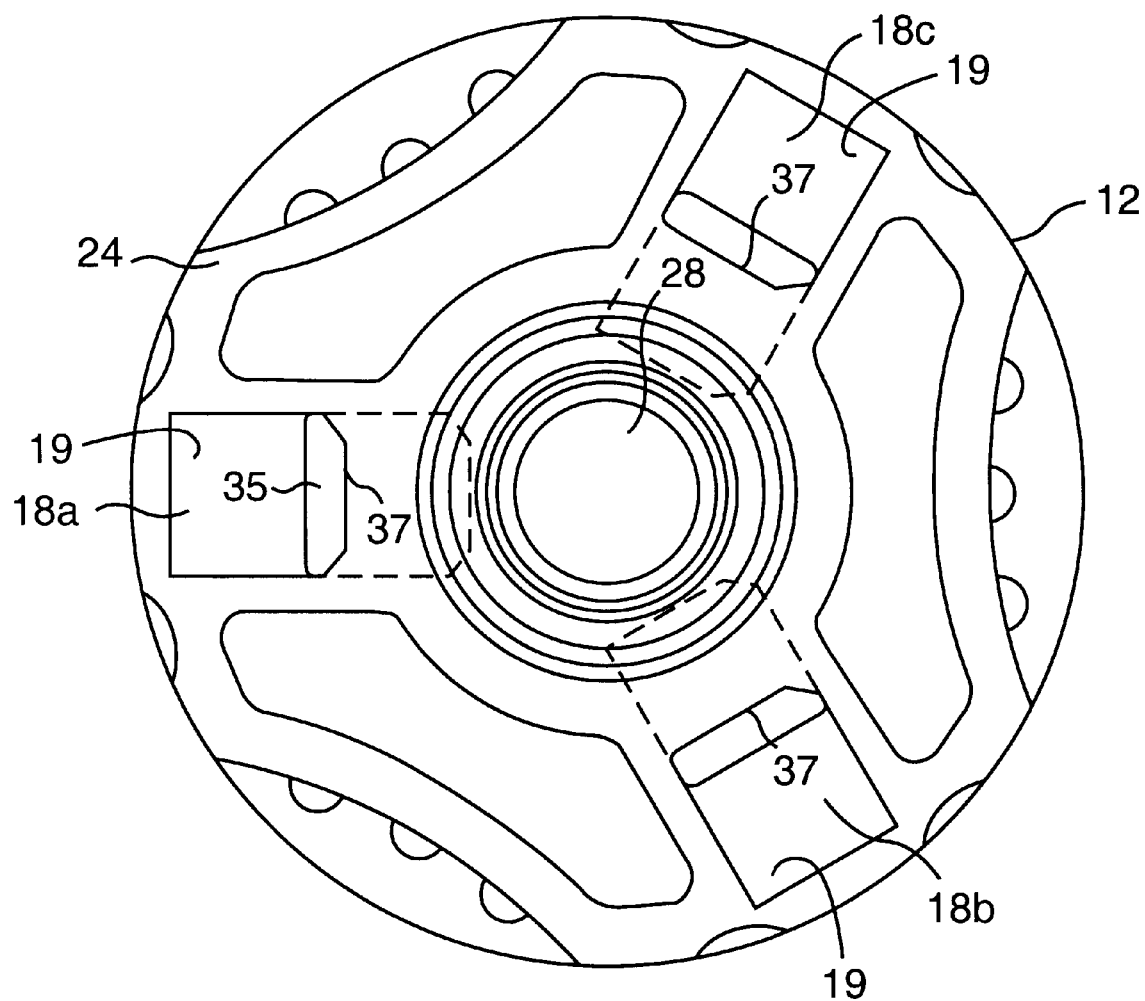
FIG. 2 is an end view of the chuck illustrated in FIG. 1 taken along the lines indicated.

Referring to FIGS. 3 through 5, the individual jaws 14 of chuck 10 illustrated in FIGS. 1 and 2 are shown. It can be seen in the figures that each jaw has threads 34 and a tool engaging face 32 defined on the opposite side thereof. Tool engaging surfaces 32 are uniform for each of the jaws and are slanted or angled so that they lie essentially parallel to the longitudinal axis 31 of chuck 10 when jaws 14 are disposed in the angled passageways 18. Threads 34 are the same pitch for each of the jaws. However, the distance 56 from the end 35 of each jaw where threads 34 start is different for each jaw. This off-set distance is required since the jaws are circumferentially spaced around the driving nut 16 but must advance and retract equally so that the jaws will exactly meet at the longitudinal axis of body 12 in their fully extended position, as illustrated in FIG. 1.

According to an important aspect of the invention, each passageway 18 and its corresponding jaw 14 have a unique characteristic or profile that permits only that respective jaw 14 to be slid within its respective passageway 180 For example, referring to FIGS. 2 through 5, side 37 of each passageway 18 corresponds to side 54 of each jaw 14. However, as can be seen from the figures, profile 48 of the jaw illustrated in FIG. 3 will only fit in profile 18a illustrated in FIG. 20 Likewise, profile 46 of jaw 14 illustrated in FIG. 4 will only fit in passageway 18b. Profile 44 of the jaw illustrated in FIG. 5 will only fit in profile 18c of the passageway illustrated in FIG. 2.

In a preferred embodiment illustrated in the figures, the jaws and respective passageways have a generally rectangular shape. However, it should be appreciated, that the cross-sectional profiles can have any geometric shape so long as at least one characteristic or keyed feature of each profile is different between the three jaws and respective passageways so that the jaws cannot be interchanged between passageways. Also, it is preferred that the threads 34 of each jaw have the same cross-sectional length 57 so that each jaw has the same degree of threaded engagement with nut 16. Thus, the keyed or other distinguishing feature of the jaws can be defined on any of the remaining sides or surfaces. For example, referring to FIG. 3, side 54 has two angled or chamfered corners. Referring to FIGS. 4 and 5, sides 54 have oppositely angled or chamfered corners. The sides of the respective passageways 18a through 18c illustrated in FIG. 2 are correspondingly shaped. The profiles of the jaws and passageways can also be thought of as having different lengths.

It should be appreciated that the differently configured profiles illustrated and described herein are but a mere example of an infinite number of ways to uniquely distinguish each respective jaw and passageway. For example, each respective jaw and passageway could have an entirely different geometric shape, such as circular, rectangular, and square. It is well within the level of those skilled in the art to conceive of any number of distinguishing characteristics or keyed features to ensure that the jaws cannot be interchanged with the passageways.

Preferably, body member 12 is formed from a moldable material, such as a plastic material or glass-filled nylon material Other moldable materials are within the scope of the invention. Since body member 12 is molded, the uniquely configured passageways 18 can be molded directly into body member 12. In this manner, the passageways do not need to be machined into body member 12 and, thus, are not required to have a generally circular shape. However, it is within the scope and spirit of the invention that body member 12 comprises a metal component and that the passageways are keyed with a machined characteristic Likewise, jaws 14 are preferably of a hard metal and their non-uniform profiles are machined surfaces. The invention is, however, not limited to metal jaws with machined surfaces. Any conventional material and means for forming the jaws are within the scope and spirit of the invention.

It should be appreciated that the uniquely profiled jaws and passageways according to the invention can be configured in any manner of conventional chuck. For example, the invention is applicable for keyed chucks, keyless chucks, and other manner of chucks wherein individual jaws are threadedly moved in passageways. Thus, it should be understood that various modifications and variations can be made in the present invention without departing from, the scope and spirit of the invention. It is intended that the present disclosure includes such variations and modifications as come within the scope of the appended claims and their equivalents.

What is claimed is:

1. A chuck for use with a manual or powered driver having a rotatable drive shaft, said chuck comprising:
   a body member having a nose section and a tail section, said nose section having an axial bore formed therein and a plurality of angularly disposed passageways formed therethrough and intersecting said axial bore;
   a plurality of jaws slidably positioned in said angularly disposed passageways, each of said jaws having a tool engaging face formed on one side thereof and threads formed on an opposite outer surface thereof;
   a nut rotatably mounted on said body member and in engagement with said threads on said jaws;
   a sleeve member in driving rotational engagement with said nut whereby when said sleeve is rotated with respect to said body member, said jaws will be moved thereby; and
   wherein each said jaw and its respective said passageway have a unique matching profile different from said other jaws and respective passageways so that said jaws cannot be interchanged with different said passageways.

2. The chuck as in claim 1, wherein each of said passageways has a different multi-sided cross-sectional profile.

3. The chuck as in claim 2, wherein at least one of a similarly disposed side of each said passageway has a different length.

4. The chuck as in claim 2, wherein said passageways have at least one differently formed corner.

5. The chuck as in claim 1, wherein each of said passageways has a different cross-sectional profile, and said respective jaws have matching cross-sectional profiles.

6. The chuck as in claim 1, wherein said jaw surface having said threads formed thereon has the same cross-sectional length for each of said jaws, and a matching side of each respective said passageway having the same cross-sectional length.

7. The chuck as in claim 1, wherein said body member is an integrally molded component with said differently profiled passageways molded directly therein.

8. The chuck as in claim 7, wherein said body member is molded from one of a plastic material or glass filled nylon material.

9. The chuck as in claim 7, wherein said body member is molded from one of a plastic material or glass filled nylon material and said jaws are machined from a metal.

10. The chuck as in claim 9, wherein said jaws have a non-uniform multi-sided profile.

11. The chuck as in claim 1, wherein said sleeve member is rotationally coupled to said nut through a press-fit.

12. The chuck as in claim 11, further comprising a nosepiece member fitted over said nose section of said body member, said nosepiece member retaining said sleeve in engagement with said nut.

13. A chuck for use with a manual or powered driver having a rotatable drive shaft, said chuck comprising:
   an integrally molded body member having a nose section and a tail section, said nose section having an axial bore formed therein and a plurality of angularly disposed passageways formed therethrough and intersecting said axial bore, each of said passageway having a profile that is different in at least one characteristic from said other passageways;
   a plurality of jaws slidably positioned in said angularly disposed passageways, each of said jaws having a tool engaging face formed on one side thereof and threads formed on an opposite outer surface thereof, each of said jaws further comprising a keyed surface that is different on each of said jaws wherein said keyed surface allows said jaw to slide within only one respective said passageway;
   a nut rotatably mounted on said body member and in engagement with said threads on said jaws; and
   a sleeve member in driving rotational engagement with said nut whereby when said sleeve is rotated with respect to said body member, said jaws will be moved thereby.

14. The chuck as in claim 13, wherein said body member is molded from a plastic material.

15. The chuck as in claim 13, wherein said body member is molded from a glass filled nylon material.

16. The chuck as in claim 13, wherein said passageways are molded directly into said body member.

17. The chuck as in claim 13, wherein said passageways have a generally rectangular cross-sectional profile with at least one side thereof having a different configuration in each of said passageways.

18. The chuck as in claim 13, wherein said jaws have a generally rectangular cross-sectional profile with said keyed surface comprising a differently configured side on each of said jaws.

19. The chuck as in claim 13, wherein each of said passageways has a different multi-sided cross-sectional profile.

20. The chuck as in claim 19, wherein at least one of a similarly disposed side of each said passageway has a different length.

21. The chuck as in claim 19, wherein said passageways have at least one differently formed corner.

22. The chuck as in claim 13, wherein each of said passageways has a different cross-sectional profile, and said respective jaws have matching cross-sectional profiles.

23. The chuck as in claim 13, wherein said jaw surface having said threads formed thereon has the same cross-sectional length for each of said jaws, and a matching side of each respective said passageway having the same cross-sectional length.

24. The chuck as in claim 13, wherein said threads on said jaws have a same pitch and are offset by different lengths from an end of said jaws.

25. A power tool having a rotatable drive spindle and a chuck configured thereon for holding a tool bit to said drive spindle, said chuck further comprising an integrally molded body member having a nose section and a tail section, said nose section having an axial bore formed therein and a plurality of angularly disposed passageways formed therethrough and intersecting said axial bore, each of said passageway having a profile that is different in at least one characteristic from said other passageways;

a plurality of jaws slidably positioned in said angularly disposed passageways, each of said jaws having a tool engaging face formed on one side thereof and threads formed on an opposite outer surface thereof, each of said jaws further comprising a keyed surface that is different on each of said jaws wherein said keyed surface allows said jaw to slide within only one respective said passageway;

a nut rotatably mounted on said body member and in engagement with said threads on said jaws; and a sleeve member in driving rotational engagement with said nut whereby when said sleeve is rotated with respect to said body member, said jaws will be moved thereby.

* * * * *